United States Patent
Kray

[15] 3,700,725
[45] Oct. 24, 1972

[54] DIALKYL PHTHALATE PROCESS
[72] Inventor: Louis R. Kray, Novato, Calif.
[73] Assignee: Chevron Research Company, San Francisco, Calif.
[22] Filed: Jan. 29, 1971
[21] Appl. No.: 111,144

[52] U.S. Cl. ............................................. 260/475 R
[51] Int. Cl. ............................................. C07c 69/80
[58] Field of Search ........................... 260/475 R, 493

[56] References Cited
UNITED STATES PATENTS
3,506,704   4/1970   Miller et al.............260/475 R

*Primary Examiner*—Lorraine A. Weinberger
*Assistant Examiner*—E. Jane Skelly
*Attorney*—A. L. Snow, F. E. Johnston, G. F. Magdeburger and D. L. Hagmann

[57] ABSTRACT

Mercuric chloride catalyses the production of dialkyl phthalate esters from the reaction of a primary alkyl bromide and phthalic acid provided that the temperature is maintained in the range 155° to 180° C.

3 Claims, No Drawings

DIALKYL PHTHALATE PROCESS

BACKGROUND OF THE INVENTION

This invention relates to a process for the production of phthalate esters from the reaction of a primary alkyl bromide with phthalic acid.

PRIOR ART

It is known to produce phthalate esters from the reaction of disodium phthalate with an alkyl halide, British Pat. No. 917,568. The direct reaction of phthalic acid with an alkyl halide would be advantageous in that the cost of the conversion of the acid to the anhydrous salt could be avoided. However, it appears that no reaction takes place in the case of the attempted direct reaction, Belgium Pat. No. 656,861.

THE INVENTION

It has now been found that primary alkyl bromides in the liquid phase form phthalate esters in a reaction with phthalic acid in the presence of mercuric chloride at a temperature in the range from about 155° C. to 180° C.

The course of the reaction is conveniently followed by noting the evolution of gaseous hydrogen bromide. In the absence of the mercuric chloride catalyst no reaction occurs. Similarly, in the presence of the mercuric chloride no reaction occurs at temperatures below about 155° C. Above 180° C. the phthalic acid is converted to the acid anhydride and water is evolved, and water inhibits the desired ester formation, even in small amounts. Therefore, the reaction mixture must be substantially anhydrous, i.e., no more than a trace of water may be present.

The reaction of the present invention is specific to primary alkyl bromides. The corresponding chlorides do not react, and the secondary bromides yield the corresponding olefinic dehydrobromination product rather than the desired ester. Similarly, mercuric bromide, surprisingly, is not a catalyst for the esterification reaction.

GENERAL PROCEDURE

To a mixture of phthalic acid and a primary alkyl bromide in the mol ratio 1 to about 2, respectively, is added about 0.1 mol of mercuric chloride per mol of the acid. If necessary, the mixture is subjected to a superatmospheric pressure sufficient to maintain the alkyl bromide in the liquid phase. After about 2 hours at 170° C. and with concurrent efficient stirring of the mixture, the reaction is discontinued and the ester is recovered by conventional means, usually by fractional distillation. A particular advantage of the process is that the hydrogen bromide which evolves during the course of the esterification is anhydrous and conveniently may be withdrawn and reacted with an α-olefin to yield primary alkyl bromide.

The addition of but a trace of $HgCl_2$ suffices, in general, to promote an appreciable production of ester. With increasing relative amounts of the chloride catalyst, there is a corresponding roughly linear increase in the rate of ester production, although the rate is not proportional to the catalyst concentration.

Mercuric chloride has in general a finite and limited solubility in the present reaction mixtures. Surprisingly, the presence of mercuric chloride in excess of the saturation value also results in improved reaction rates. In the latter event, the reaction system, of course, is a heterogeneous liquid-solid mixture. In general, a satisfactory amount of $HgCl_2$ per mol of phthalic acid in the mixture will be in the range from 0.1 to 2. Usually best results obtain when the amount employed is in the range 1 to about 2 mol of $HgCl_2$ per mol of the acid.

If desired, the reaction may be carried out in a solvent, and usually the employment of an inert solvent is advantageous in that a somewhat higher yield relative to that for the neat reaction system is usually experienced. Representative inert solvents include phthalate esters, preferably the ester being produced, a chlorobenzene, for example o-dichlorobenzene, and the like aromatic compounds.

The amount of the alkyl bromide relative to phthalic acid which should be employed varies depending upon the particular primary bromide of the feed mixture. Usually a feed mixture containing about a stoichiometric amount, 2 mols of bromide per mol of acid, will yield the best results. Broadly, an acid to bromide mol ratio in the range 1 to 1-4, preferably 2-4, will be satisfactory. Ratios outside this range may also be employed, but such is usually inefficient in terms of utilization of the reactor volume and the burden inherent in a substantial recycle stream. Useful conversions are in general experienced when the reaction period is in the range from about 0.5 to 4 hours, preferably 1-3 hours.

Primary alkyl bromides of the formula $RCH_2Br$ where R is a saturated hydrocarbon radical, i.e., $R=C_nH_{N+1}$, are in general satisfactory for use and are contemplated for use in the process herein provided that the bromide is a liquid per se at a temperature in the process range or is liquifiable under the influence of a superatmospheric pressure or in the presence of an inert diluent, or both, e.g., a liquifiable primary alkyl bromide.

As a practical matter for reasons of availability and convenience in processing, alkyl bromides of the above formula having a carbon atom content in the range 3 to 31 (R is of the $C_2$—$C_{30}$ range and may be a straight or branched chain group) are preferred feed compounds. Most preferable are those feeds in which R of the above formula is a straight chain $C_4$—$C_{20}$ alkyl group. The process feeds contemplated herein are inclusive of one or more of the formulated primary alkyl bromides.

Representative primary bromides suitable for use in the process of the invention include n-propyl, n-butyl, n-pentyl, isopentyl, n-hexyl, isohexyl, n-heptyl, isoheptyl, n-octyl, 3-methyloctyl, n-decyl, n-dodecyl, n-octadecyl, n-eicosyl, 2,3-dimethyl, n-hentriacontyl, 3-isopropylhexyl, and the like primary alkyl bromides and mixtures thereof.

The following examples further illustrate the invention.

In the examples, a representative alkyl bromide, 1-bromooctane, was employed. Phthalic acid and the bromide in a mol ratio of 1 to 4, respectively, were charged to a corrosion resistant reactor equipped with a mechanical stirrer and a gas inlet and exit means. Nitrogen was passed through the reaction vessel and the evolved hydrogen bromide was collected for analysis. Other conditions and the results are listed in the Table below.

| ex. no. | Catalyst | Mol cat./ Mol of Acid | time hrs. | temp °C. | HBr evolved % of Theory | Ester produced, % of Theory |
|---|---|---|---|---|---|---|
| 1 | None | — | 1.5 | 162 | None | None |
| 2 | $HgCl_2$ | 2 | 2 | 167 | 65 | 80[1] |
| 3 | $HgBr_2$ | 2 | 1 | 154 | None | None |
| 4 | $Hg(NO_3)_2$ | 2 | 0.3 | 165 | Green Gas! | None |
| 5 | LiBr | 2 | 1.4 | 162 | None | None |

(1) No mono-octyl phthalate could be detected in the ester product.

These and other data demonstrate that mercuric chloride is a unique esterification catalyst, and that it is useful for the production of phthalate esters by the reaction of phthalic acid with a liquifiable primary alkyl bromide provided that the temperature of the reaction mixture is within the range above 155° C. and below 180° C.

Phthalate esters are well known and have many uses in the art. The octyl esters, for example, are employed as plasticizers for polyvinyl chloride- and acetate-type polymers.

I claim:

1. The process for the production of a primary dialkyl phthalate ester which comprises reacting a primary alkyl bromide with phthalic acid by maintaining a substantially anhydrous mixture of said reactants in the liquid phase at a temperature in the range from about 155° C. to 180° C., and in the presence of mercuric chloride, wherein for each mol of phthalic acid said mixture contains an amount of primary alkyl bromide in the range from about 1 to 4 mols, and an amount of said chloride in the range from 0.1 to 2 mols; said bromide being liquifiable at the reaction temperature and being of the formula $RCH_2Br$, wherein R is an alkyl group having a carbon atom content in the range 2 to 30.

2. The process as in claim 1 wherein the amount of the chloride catalyst is in the range from about 1 to 2 mols and of the bromide is in the range from about 2 to 4, and wherein said R is a straight chain group having a carbon atom content in the range from 4 to 20.

3. The process for the production of dioctyl phthalate which consists essentially of reacting n-octyl bromide with phthalic acid in the presence of mercuric chloride by maintaining a substantially anhydrous mixture of said reactants and chloride in the liquid phase at a temperature of about 167° C. for a period of about two hours, wherein for each mol of the acid the mixture contains about 2 mols of said chloride and about 4 mols of said bromide.

* * * * *